US011855498B2

(12) United States Patent
Deshpande et al.

(10) Patent No.: US 11,855,498 B2
(45) Date of Patent: Dec. 26, 2023

(54) PATTERNS FOR BALANCED STATOR WINDINGS IN ELECTRIC MOTOR

(71) Applicant: Atieva, Inc., Newark, CA (US)

(72) Inventors: Yateendra Deshpande, Sunnyvale, CA (US); Vivek Meenakshi Sundaram, Newark, CA (US); Emad Dlala, Pleasanton, CA (US)

(73) Assignee: Atieva, Inc., Newark, CA (US)

( * ) Notice: Subject to any disclaimer, the term of this patent is extended or adjusted under 35 U.S.C. 154(b) by 345 days.

(21) Appl. No.: 16/949,902

(22) Filed: Nov. 19, 2020

(65) Prior Publication Data

US 2022/0158512 A1 May 19, 2022

(51) Int. Cl.
  *H02K 3/12* (2006.01)
  *H02K 3/28* (2006.01)
  *H02K 15/085* (2006.01)
  *H02K 17/12* (2006.01)

(52) U.S. Cl.
  CPC ............. *H02K 3/12* (2013.01); *H02K 3/28* (2013.01); *H02K 15/085* (2013.01); *H02K 17/12* (2013.01)

(58) Field of Classification Search
  CPC .............. H02K 3/12; H02K 3/14; H02K 3/28
  USPC ......................... 310/202, 203, 207
  See application file for complete search history.

(56) References Cited

U.S. PATENT DOCUMENTS

| | | |
|---|---|---|
| 4,409,507 A | 10/1983 | Godwin |
| 6,359,361 B1 | 3/2002 | Wakui et al. |
| 6,563,247 B2 | 5/2003 | Nguyen |
| 8,069,555 B2 | 12/2011 | Tang et al. |
| 10,868,448 B2 * | 12/2020 | Saito ............ H02K 3/04 |
| 2011/0198961 A1 | 8/2011 | Tang et al. |

(Continued)

FOREIGN PATENT DOCUMENTS

| | | |
|---|---|---|
| JP | 2012130093 A | 7/2012 |
| JP | 5354302 B2 | 11/2013 |

(Continued)

OTHER PUBLICATIONS

Machine translation of JP 2019-201485 A, Year 2019 (Year: 2019).*

(Continued)

*Primary Examiner* — Quyen P Leung
*Assistant Examiner* — Minki Chang
(74) *Attorney, Agent, or Firm* — Brake Hughes Bellermann LLP

(57) ABSTRACT

An electric motor comprises: a rotor having poles equaling a first number; and a stator having slots equaling a second number, the stator having stator windings formed by conductors wound in a wave pattern around the stator, wherein a third number of the conductors are located in each of the slots, wherein the conductors form three balanced parallel paths through the slots, each of the conductors in the three balanced parallel paths undergoing a same number of pitch turns, each of the pitch turns being either a standard pitch turn or a nonstandard pitch turn, the standard pitch turn involving wrapping around slots equaling the second number divided by the first number, the nonstandard pitch turn involving wrapping around more or fewer slots than the standard pitch turn, wherein each of the three balanced parallel paths forms a repeating pattern throughout the slots.

16 Claims, 17 Drawing Sheets

(56) References Cited

U.S. PATENT DOCUMENTS

| | | | |
|---|---|---|---|
| 2016/0308413 A1* | 10/2016 | Ciampolini | ........ H02K 15/0081 |
| 2018/0034335 A1 | 2/2018 | Neet et al. | |
| 2020/0014267 A1 | 1/2020 | Rahman et al. | |
| 2020/0244126 A1 | 7/2020 | Neet et al. | |
| 2021/0376680 A1* | 12/2021 | Yang | ........................ H02K 3/28 |

FOREIGN PATENT DOCUMENTS

| | | | | |
|---|---|---|---|---|
| JP | 5677530 B2 | | 1/2015 | |
| JP | 2015035835 A | | 2/2015 | |
| JP | 6048160 B2 | | 12/2016 | |
| JP | 2018085872 A | | 5/2018 | |
| JP | 2019201485 A | * | 11/2019 | .............. H02K 3/12 |
| WO | 2007088598 A1 | | 8/2007 | |
| WO | 2011030874 A1 | | 3/2011 | |
| WO | 2013136845 A1 | | 9/2013 | |

OTHER PUBLICATIONS

International Search Report and Written Opinion for PCT Application No. PCT/US2021/072460, dated Feb. 28, 2022, 11 pages.

\* cited by examiner

FIG. 2A

| | | PHASE V POLE 4 | | | | | | | | PHASE U POLE 4 | | | | | | | PHASE W POLE 4 | | | | | | | PHASE V POLE 5 | | | | | | | PHASE U POLE 5 | | | | | | PHASE W POLE 5 | | |
|---|---|---|---|---|---|---|---|---|---|---|---|---|---|---|---|---|---|---|---|---|---|---|---|---|---|---|---|---|---|---|---|---|---|---|---|---|---|---|---|
| Slot | 58 | 59 | 60 | 61 | 62 | 63 | 64 | 65 | 66 | 67 | 68 | 69 | 70 | 71 | 72 | 1 | 2 | 3 | 4 | 5 | 6 | 7 | 8 | 9 |
| +/- | (+) | (+) | (+) | (+) | (-) | (-) | (-) | (-) | (+) | (+) | (+) | (+) | (-) | (-) | (-) | (-) | (+) | (+) | (+) | (+) | (-) | (-) | (-) | (-) |

| | | Coil 1 pitch | Coil 2 pitch | Coil 3 pitch |
|---|---|---|---|---|
| Pole1 | Wrap1 | 12 | 12 | 12 |
| Pole2 | Wrap1 | 12 | 12 | 12 |
| Pole3 | Wrap1 | 12 | 12 | 12 |
| Pole4 | Wrap1 | 13 | 13 | 13 |
| Pole5 | Wrap1 | 12 | 12 | 12 |
| Pole6 | Wrap1 | 12 | 12 | 12 |
| Pole1 | Wrap2 | 12 | 12 | 12 |
| Pole2 | Wrap2 | 13 | 13 | 9 |
| Pole3 | Wrap2 | 12 | 12 | 12 |
| Pole4 | Wrap2 | 12 | 12 | 12 |
| Pole5 | Wrap2 | 12 | 12 | 12 |
| Pole6 | Wrap2 | 13 | 9 | 13 |
| Pole1 | Wrap3 | 12 | 12 | 12 |
| Pole2 | Wrap3 | 12 | 12 | 12 |
| Pole3 | Wrap3 | 12 | 12 | 12 |
| Pole4 | Wrap3 | 9 | 13 | 13 |
| Pole5 | Wrap3 | 12 | 12 | 12 |
| Pole6 | Wrap3 | 12 | 12 | 12 |
| Pole1 | Wrap4 | 12 | 12 | 12 |
| Pole2 | Wrap4 | 13 | 13 | 13 |
| Pole3 | Wrap4 | 12 | 12 | 12 |
| Pole4 | Wrap4 | 12 | 12 | 12 |
| Pole5 | Wrap4 | 12 | 12 | 12 |
| Pole6 | Wrap4 | 13 | 13 | 9 |

FIG. 4A

|  |  | Coil 1 pitch | Coil 2 pitch | Coil 3 pitch |
|---|---|---|---|---|
| Pole1 | Wrap1 | 12 | 12 | 12 |
| Pole2 | Wrap1 | 12 | 12 | 12 |
| Pole3 | Wrap1 | 12 | 12 | 12 |
| Pole4 | Wrap1 | 13 | 9 | 13 |
| Pole5 | Wrap1 | 12 | 12 | 12 |
| Pole6 | Wrap1 | 12 | 12 | 12 |
| Pole1 | Wrap2 | 12 | 12 | 12 |
| Pole2 | Wrap2 | 9 | 13 | 13 |
| Pole3 | Wrap2 | 12 | 12 | 12 |
| Pole4 | Wrap2 | 12 | 12 | 12 |
| Pole5 | Wrap2 | 12 | 12 | 12 |
| Pole6 | Wrap2 | 13 | 13 | 13 |
| Pole1 | Wrap3 | 12 | 12 | 12 |
| Pole2 | Wrap3 | 12 | 12 | 12 |
| Pole3 | Wrap3 | 12 | 12 | 12 |
| Pole4 | Wrap3 | 13 | 13 | 9 |
| Pole5 | Wrap3 | 12 | 12 | 12 |
| Pole6 | Wrap3 | 12 | 12 | 12 |
| Pole1 | Wrap4 | 12 | 12 | 12 |
| Pole2 | Wrap4 | 13 | 9 | 13 |
| Pole3 | Wrap4 | 12 | 12 | 12 |
| Pole4 | Wrap4 | 12 | 12 | 12 |
| Pole5 | Wrap4 | 12 | 12 | 12 |
| Pole6 | Wrap4 | 9 | 13 | 13 |

| 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
|---|---|---|---|---|---|---|---|---|---|---|---|---|---|---|---|---|---|---|---|---|---|---|---|---|---|---|---|---|---|---|---|---|---|---|
| CX | BX | BY | BZ | BX | AX | AY | AZ | AX | CX | CY | CZ | CX | BX | BX | BY | BZ | AX | AX | AY | AZ | CX | CX | CY | CZ | BX | BX | BY | BZ | AX | AX | AY | AZ | CX | CX |
| BX | BY | BZ | BX | BY | AY | AZ | AX | AY | CY | CZ | CX | CY | BY | BY | BZ | BX | AX | AY | AZ | AX | CX | CY | CZ | CX | BX | BY | BZ | BY | AX | AY | AZ | AX | CX | CX |
| BY | BZ | BX | BX | BY | AY | AZ | AY | AY | CY | CZ | CX | CY | BY | BZ | BX | BX | AY | AY | AZ | AY | CY | CY | CZ | CX | BY | BY | BZ | BY | AY | AY | AZ | AX | CY | CY |
| BZ | BZ | BX | BX | BY | AZ | AX | AY | AZ | CZ | CX | CY | CY | BZ | BZ | BX | BY | AZ | AZ | AX | AY | CY | CZ | CX | CY | BZ | BY | BX | BX | AY | AZ | AX | AY | CY | CY |
| BZ | BX | BX | BY | BZ | AZ | AX | AY | AZ | CZ | CX | CY | CZ | BZ | BX | BX | BY | AZ | AX | AY | AZ | CZ | CX | CX | CY | BZ | BX | BX | BY | AZ | AX | AY | AZ | CZ | CZ |
| CX | BX | BY | BZ | BX | AX | AY | AZ | AX | CX | CY | CZ | CX | BX | BY | BZ | BX | AX | AY | AZ | AX | CZ | CX | CY | CZ | BX | BY | BZ | BX | AX | AY | AZ | AY | CZ | CZ |

| 702 | 704 | Coil 1 pitch | Coil 2 pitch | Coil 3 pitch |
|---|---|---|---|---|
| Pole1 | Wrap1 | 706~12 }712 | 12 | 12 |
| Pole2 | Wrap1 | 708~13 | 13 | 13 |
| Pole3 | Wrap1 | 12 | 12 | 12 |
| Pole4 | Wrap1 | 13 | 13 | 9 |
| Pole5 | Wrap1 | 12 | 12 | 12 |
| Pole6 | Wrap1 | 13 | 9 | 13 |
| Pole1 | Wrap2 | 12 }714 | 12 | 12 |
| Pole2 | Wrap2 | 710~9 | 13 | 13 |
| Pole3 | Wrap2 | 12 | 12 | 12 |
| Pole4 | Wrap2 | 13 | 13 | 13 |
| Pole5 | Wrap2 | 12 | 12 | 12 |
| Pole6 | Wrap2 | 13 | 13 | 9 |
| Pole1 | Wrap3 | 12 | 12 | 12 |
| Pole2 | Wrap3 | 13 | 9 | 13 |
| Pole3 | Wrap3 | 12 | 12 | 12 |
| Pole4 | Wrap3 | 9 | 13 | 13 |
| Pole5 | Wrap3 | 12 | 12 | 12 |
| Pole6 | Wrap3 | 13 | 13 | 13 |
| Pole1 | Wrap4 | 12 | 12 | 12 |
| Pole2 | Wrap4 | 13 | 13 | 9 |
| Pole3 | Wrap4 | 12 | 12 | 12 |
| Pole4 | Wrap4 | 13 | 9 | 13 |
| Pole5 | Wrap4 | 12 | 12 | 12 |
| Pole4 | Wrap4 | 9 | 13 | 13~705 |

| | | Coil 1 pitch | Coil 2 pitch | Coil 3 pitch |
|---|---|---|---|---|
| Pole1 | Wrap1 | 12 | 12 | 12 |
| Pole2 | Wrap1 | 13 | 13 | 13 |
| Pole3 | Wrap1 | 12 | 12 | 12 |
| Pole4 | Wrap1 | 13 | 13 | 9 |
| Pole5 | Wrap1 | 12 | 12 | 12 |
| Pole6 | Wrap1 | 13 | 9 | 13 |
| Pole1 | Wrap2 | 12 | 12 | 12 |
| Pole2 | Wrap2 | 9 | 13 | 13 |
| Pole3 | Wrap2 | 12 | 12 | 12 |
| Pole4 | Wrap2 | 13 | 13 | 13 |
| Pole5 | Wrap2 | 12 | 12 | 12 |
| Pole6 | Wrap2 | 13 | 13 | 9 |
| Pole1 | Wrap3 | 12 | 12 | 12 |
| Pole2 | Wrap3 | 13 | 9 | 13 |
| Pole3 | Wrap3 | 12 | 12 | 12 |
| Pole4 | Wrap3 | 9 | 13 | 13 |
| Pole5 | Wrap3 | 12 | 12 | 12 |
| Pole6 | Wrap3 | 13 | 13 | 13 |
| Pole1 | Wrap4 | 12 | 12 | 12 |
| Pole2 | Wrap4 | 13 | 13 | 9 |
| Pole3 | Wrap4 | 12 | 12 | 12 |
| Pole4 | Wrap4 | 13 | 9 | 13 |
| Pole5 | Wrap4 | 12 | 12 | 12 |
| Pole4 | Wrap4 | 9 | 13 | 13 |

FIG. 7B

PATTERNS FOR BALANCED STATOR WINDINGS IN ELECTRIC MOTOR

TECHNICAL FIELD

This document relates to patterns for balanced stator windings in an electric motor.

BACKGROUND

Today, electric motors are becoming more prevalent and are being developed for increased performance and improved characteristics. An electric motor can be used (e.g., by itself or in combination with at least one other motor of the same or a different type) for one or more purposes, including, but not limited to, to propel a vehicle. Motor characteristics that have particular importance include, but are not limited to, efficiency, performance, size, manufacturing cost, and weight.

SUMMARY

In an aspect, an electric motor comprises: a rotor having poles equaling a first number; and a stator having slots equaling a second number, the stator having stator windings formed by conductors wound in a wave pattern around the stator, wherein a third number of the conductors are located in each of the slots, wherein the conductors form three balanced parallel paths through the slots, each of the conductors in the three balanced parallel paths undergoing a same number of pitch turns, each of the pitch turns being either a standard pitch turn or a nonstandard pitch turn, the standard pitch turn involving wrapping around slots equaling the second number divided by the first number, the nonstandard pitch turn involving wrapping around more or fewer slots than the standard pitch turn, wherein each of the three balanced parallel paths forms a repeating pattern throughout the slots.

Implementations can include any or all of the following features. The first number is 6. The second number is 72. The third number is 6. Each of the conductors has a rectangular cross section, and wherein each of the slots is configured to hold the third number of the conductors in a linear arrangement. The repeating pattern comprises the nonstandard pitch turn occurring at every fourth pole. The repeating pattern includes a first pattern in which the standard pitch turn involves wrapping around 12 slots and in which the nonstandard pitch turn involves wrapping around 13 slots. The repeating pattern further includes a second pattern in which the standard pitch turn involves wrapping around 12 slots and in which the nonstandard pitch turn involves wrapping around 9 slots. The repeating pattern includes the first pattern occurring three times in a row followed by the second pattern occurring once. The repeating pattern comprises the nonstandard pitch turn occurring at every other pole. The repeating pattern includes a first pattern in which the standard pitch turn involves wrapping around 12 slots and in which the nonstandard pitch turn involves wrapping around 13 slots. The repeating pattern further includes a second pattern in which the standard pitch turn involves wrapping around 12 slots and in which the nonstandard pitch turn involves wrapping around 9 slots. The repeating pattern includes the first pattern occurring three times in a row followed by the second pattern occurring once. The electric motor has three phases. Each of the phases is associated with a corresponding one of three phase belts formed by the conductors, each phase belt having a first dimension of four slots and a second dimension of six conductors. Each of the phase belts, in each slot in the first dimension, has equally many of the conductors associated with respective ones of the three phases. Each of the phase belts has at most four conductors associated with a respective one of the three phases positioned as a contiguous group in the first and second dimensions. Each of the phase belts has at most two conductors associated with a respective one of the three phases positioned adjacent each other. Adjacent each other corresponds to being positioned along the first dimension. Adjacent each other corresponds to being positioned along the second dimension.

BRIEF DESCRIPTION OF DRAWINGS

FIGS. 2A-2C show an example of winding wraps for conductors of a stator.

FIGS. 3A-3C show an example of a winding pattern that can be obtained using the winding wraps of FIGS. 2A-2C.

FIGS. 4A-4B show an example of pitch turns that can occur in the winding pattern of FIGS. 3A-3C.

FIGS. 5A-5C show an example of winding wraps for conductors of a stator.

FIGS. 6A-6C show an example of a winding pattern that can be obtained using the winding wraps of FIGS. 5A-5C.

FIGS. 7A-7B show an example of pitch turns that can occur in the winding pattern of FIGS. 6A-6C.

Like reference symbols in the various drawings indicate like elements.

DETAILED DESCRIPTION

Figure 1:
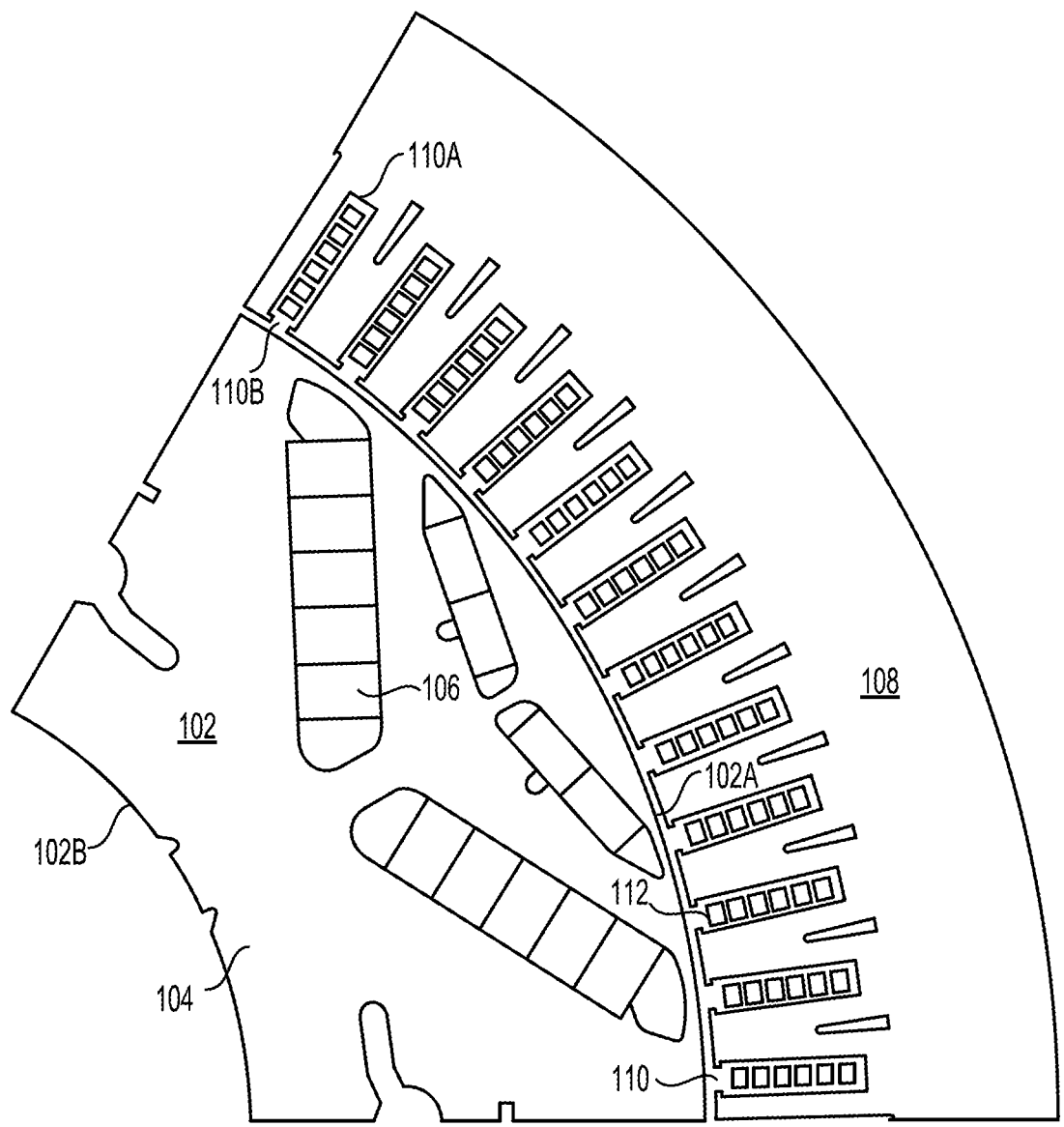
FIG. 1 shows a cross-section view of an example of one sixth of an electric motor.

This document describes examples of systems and techniques for designing and manufacturing a stator using one or more patterns that will provide balanced stator windings. An electric motor can have any of multiple different number of poles, number of stator slots, and/or number of conductors per stator slot. In some implementations, an electric motor can have six poles, 72 stator slots, and six conductors per stator slot. The conductors in the stator windings make pitch turns of varying lengths, which improves efficiency, size, and manufacturing cost. As such, the stator windings can make pitch turns that are either standard pitch turn or a nonstandard pitch turn. In some implementations, the pitch turns can form a repeating pattern throughout the slots. For example, the repeating pattern can include that the nonstandard pitch turn occurs at every fourth pole. As another example, the repeating pattern can include that the nonstandard pitch turn occurs at every other pole.

The approach taken in a previous attempt at designing a 72-slot, 6 conductors-per-slot electric motor illustrates advantages of the present subject matter. That previous motor had stator windings that made pitch turns of the same length all around the stator. In order to make the stator windings balanced, it was necessary to partially encircle the stator with a relatively large and heavy busbar assembly so as to interconnect the windings. Also, the design chosen in that prior approach used hairpin windings which required a significant number (about 216) of welds in manufacturing each stator.

Examples described herein refer to an electric motor. As used herein, an electric motor includes at least a stator, which is a stationary part through which energy flows, that generates a rotating magnetic field to cause a rotor to rotate about its axis. A motor can be either of at least a permanent magnet motor or an induction motor. The rotor can include laminations and/or windings, to name just two examples. The stator includes slots arranged so as to face the rotor across an air gap. The slots are configured for holding stator windings (i.e., conductors) through which alternating current is caused to flow. A stator winding can include one or more electrically conductive materials, including, but not limited to, a metal such as copper. Power electronics (e.g., an inverter) can generate alternating current for the stator.

Examples described herein refer to stator windings being wound in a wave pattern. As used herein, a wave pattern is an arrangement where a conductor of a stator winding that exits a slot bypasses one or more nearby slots before entering another slot somewhere else around the stator. The stator winding can circulate essentially one or more laps around the stator before the circuit of the stator winding is complete. As such, the wave pattern is formed by one or more paths that the stator winding takes on its way around the stator.

Examples described herein refer to the stator windings, and/or the path(s) in which they are wound, as being balanced. As used herein, stator windings are balanced in an electrical sense when the respective amounts of flux captured by each of multiple parallel paths of the stator winding (associated with respective phases) are equal. Stated oppositely, if the fluxes of such paths are not equal to each other, current can begin to circulate in the parallel paths. Two parallel electrical paths have corresponding ends electrically shorted to each other. As such, each parallel path includes one wire that is wrapped around and laps the stator multiple times.

Examples described herein refer to stator windings being arranged at least in part according to a repeating pattern. As used herein, a repeating pattern occurs at least twice along the length of a given one of multiple parallel paths. The repeating pattern can, but does not necessarily, extend from one end of the parallel path to the other.

Examples described herein refer to a conductor of a stator winding having a rectangular cross section. As used herein, a rectangular cross section is the profile of the conductor in a plane that is essentially perpendicular to the main direction of current flow through the conductor. The rectangular cross section can include a rectangular shape having any of multiple different aspect ratios. For example, the rectangular shape can be a square. As another example, the rectangular shape can have two parallel sides of common length that are longer than the common length of two other parallel sides.

FIG. 1 shows a cross-section view of an example of one sixth of an electric motor 100. Here, only the one sixth is being shown, and the remainder of the electric motor 100 is being omitted, for clarity. As such, the components of the electric motor 100 that are described below may additionally include other features and/or parts that are not visible here. The electric motor 100 can be used with one or more other examples described elsewhere herein.

The electric motor 100 includes a rotor 102. The rotor 102 is here shown to have an outer circumference 102A (sometimes referred to as an outer diameter), and an inner circumference 102B (sometimes referred to as an inner diameter). The rotor 102 is configured to be driven by a rotating magnetic field so as to rotate about a central axis (not shown). For example, the rotor 102 can have a so-called active core where a differential (not shown) is fully or partially integrated within an inside of a rotor shaft.

The rotor 102 can be designed according to any of multiple operational principles. In some implementations, the rotor 102 is formed from laminations 104 that are stacked so as to be essentially perpendicular to the axis of rotation. For example, the laminations 104 can be made of a metal, including, but not limited to, a steel material.

The rotor 102 can be designed to have multiple poles that facilitate the rotor 102 to be driven by a rotating magnetic field during operation of the electric motor 100. In some implementations, the rotor 102 can have six poles. For example, one of the poles is visible in the one-sixth of the rotor 102 that is shown in the present illustration, and the other (e.g., five) poles can be distributed equidistantly from each other in other parts of the rotor 102 that are not shown here. The poles of the rotor 102 can be generated in different ways. In some implementations, permanent magnets 106 can be included in the rotor 102. For example, the permanent magnets 106 are here arranged substantially in form of a relatively smaller V shape that is nested within a relatively larger V shape. Other approaches can be used instead of, or in addition to, the above.

The electric motor 100 includes a stator 108 that surrounds the rotor 102. The stator 108 includes a number of slots 110. In some implementations, the stator 108 has 72 slots 110 that are distributed equidistantly from each other around the rotor 102. Each of the slots 110 is configured to hold conductors 112 that form a stator winding of the stator 108. The stator 108 can have a number of the conductors 112 in each of the slots 110. In some implementations, there are six conductors 112 in each of the slots 110. The conductors 112 can have any suitable shape. In some implementations, the conductors 112 have a rectangular cross-section. The conductors 112 can be arranged within the slot 110 in one or more ways. In some implementations, each of the slots 110 is configured to hold a number of the conductors 112 (e.g., six of them) in a linear arrangement between a back 110A of the slot 110 and a front 110B of the slot 110. The front 110B of the slot 110 can be located adjacent an air gap between the stator 108 and the rotor 102, the air gap formed at a stator bore of the stator 108 that accommodates the rotor 102.

Figure 2B:
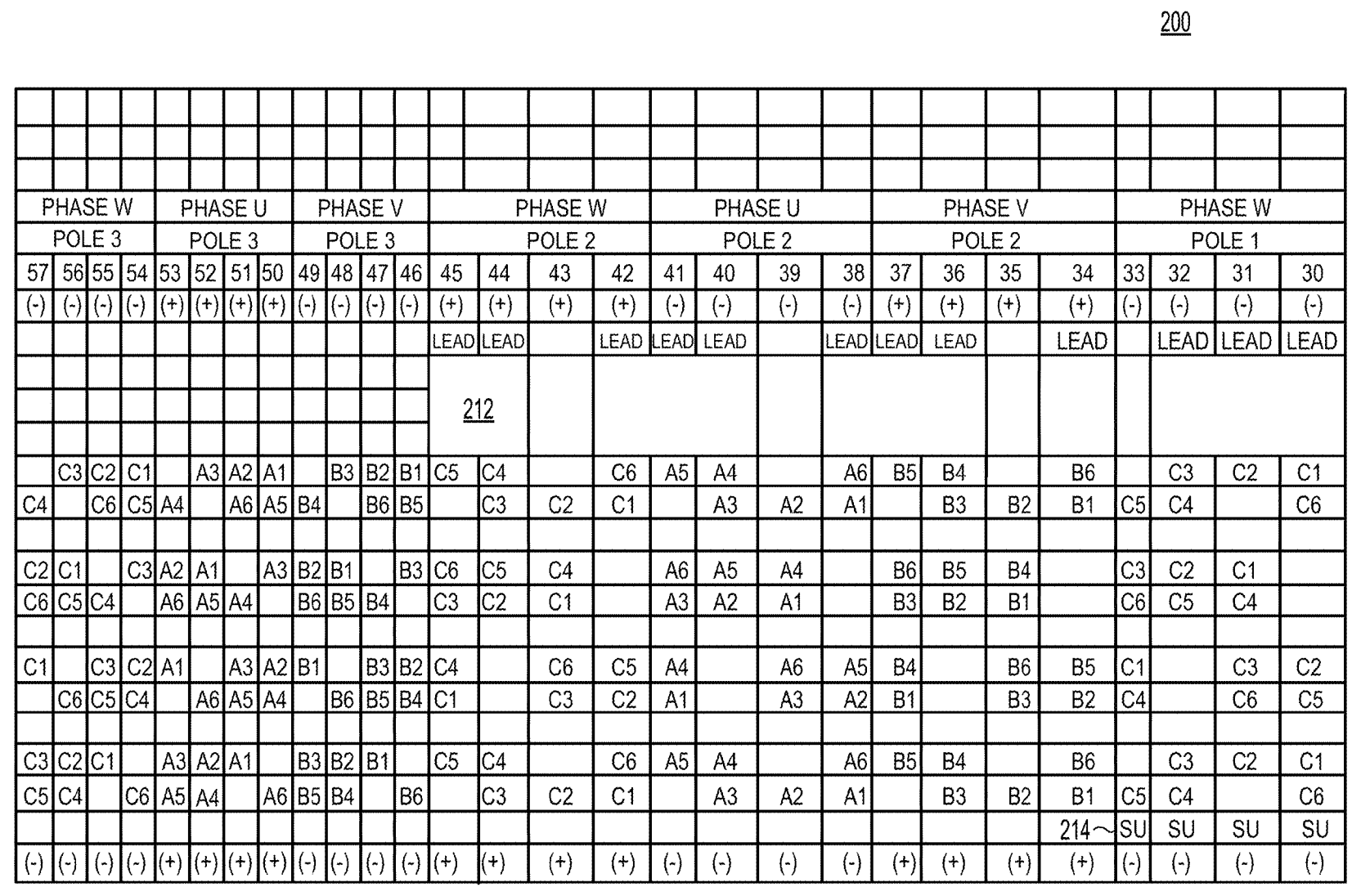
Figure 2C:
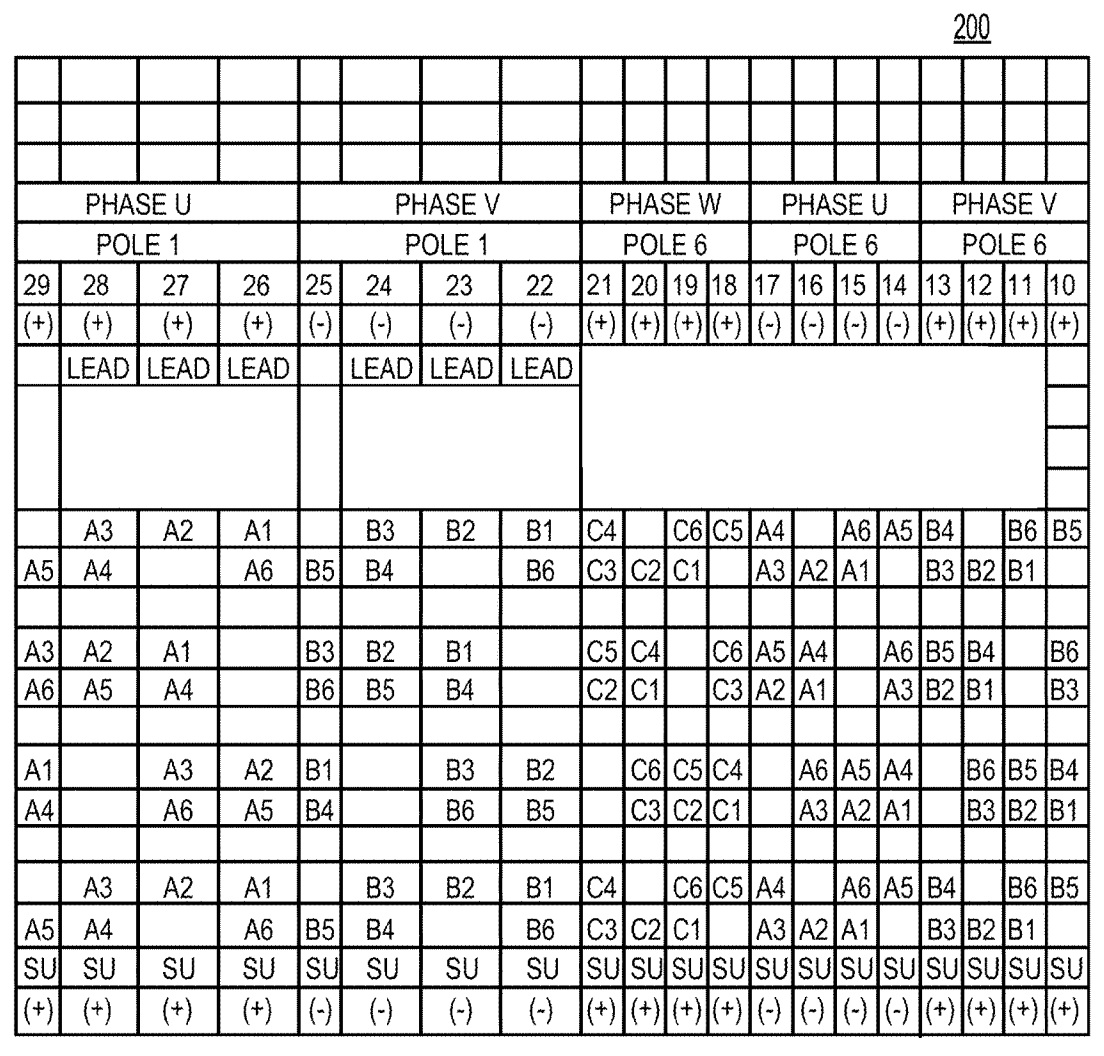

FIGS. 2A-2C show an example 200 of winding wraps for conductors of a stator. The example 200 can be used with one or more other examples described elsewhere herein. The example 200 here presents the structure of the stator winding by way of schematically showing slots 202 of the stator (here, "slot position") and for each of the slots 202 indicating conductors 204 that are being positioned within that slot 202. Here, the slots 202 are configured to hold respective ones of the conductors 204 in a linear arrangement between a back 202A of the slot 202 and a front 202B of the slot 110 (FIG. 1) (e.g., at an air gap or stator bore). A number of each slot is here indicated by a corresponding label 203 in the example 200.

Each of the conductors 204 is shown by way of a label (e.g., C2, B3, or A1) that is placed within a cell of the table shown in the example 200, the cell corresponding to a potential location for a conductor. The alphabetical character within each label of the conductors 204 (i.e., here A, B, or C) corresponds to an electrical phase with which that conductor 204 is associated. The number within each label of the conductors 204 (i.e., here 1, 2, 3, 4, 5, or 6) distinguishes the different conductors associated with the same phase from each other, and allows the reader to follow the path of any conductor 204 through the example 200. That is, a conductor 204 that is labeled B2 is an electric wire other than, say, the electric wire of a conductor 204 that is labeled B5. Nevertheless, these (and/or other) conductors may at some point be electrically connected to each other, for example as illustrated below.

The example 200 illustrates that the stator can have a number of poles 206. In some implementations, the stator exemplified by the example 200 has six poles 206. For example, each of the poles 206 can be associated with twelve of the slots 202.

The current of the stator in the example 200 can have multiple phases, and the example 200 here indicates a phase 208 for each of the slots 202. In some implementations, the stator can have three phases 208. For example, every group of four slots among the slots 202 can be associated with a respective one of the phases 208.

The stator winding in the example 200 can be formed by way of positioning the conductors 204 within respective ones of the slots 202 in an order corresponding to one or more wraps 210. The first one of the wraps 210 can involve placing some of the conductors 204 at or near the back 202A of the slots 202. Zero or more additional ones of the wraps 210 can subsequently be performed, as schematically illustrated. The last one of the wraps 210 can involve placing some of the conductors 204 at or near the front 202B of the slots 202. Here, the example 200 includes four ones of the wraps 210. In the winding process, the conductors 204 can first be wound linearly (e.g., on a flat surface), and thereafter coiled into respective ones of the slots 202. In so doing, those of the conductors 204 that are allocated to the same slot 202 can be placed nearer each other than what is schematically illustrated in the example 200. For example, all of the conductors 204 (e.g., six conductors) that are in the same one of the slots 202 can be placed adjacent (e.g., abutting) each other.

The conductors 204 can be wound in a wave pattern, (e.g., as indicated in the illustration) so as to form parallel paths through the slots 202. In some implementations, the parallel paths are balanced. For example, the conductors can form three balanced parallel paths. Each of the phases 208 can be associated with a corresponding one of multiple phase belts formed by the conductors 204. Here, leads 212 are formed at endpoints of some of the conductors 204. Each of the leads 212 is connected to some of the conductors 204. For example, one of the leads 212 associated with those of the slots 202 that have numbers 22-24 is here connected to those of the conductors 204 that have labels B1, B2, and B3. As another example, another one of the leads 212 associated with those of the slots 202 that have numbers 26-28 is here connected to those of the conductors 204 that have labels A1, A2, and A3. As another example, another one of the leads 212 associated with those of the slots 202 that have numbers 30-32 is here connected to those of the conductors 204 that have labels C1, C2, and C3. As another example, another one of the leads 212 associated with those of the slots 202 that have numbers 34-36 is here connected to those of the conductors 204 that have labels B4, B5, and B6. As another example, another one of the leads 212 associated with those of the slots 202 that have numbers 38-40 is here connected to those of the conductors 204 that have labels A4, A5, and A6. As another example, another one of the leads 212 associated with those of the slots 202 that have numbers 42-44 is here connected to those of the conductors 204 that have labels C4, C5, and C6. Other approaches can be used.

Two or more of the conductors 204 can be joined or otherwise be part of a common coil. In some implementations, one or more series connections 214 can be made at the front 202B of the slots 202. For example, respective ones of the series connection 214 can be provided between pairs of the conductors 204 as shown in the following table:

| Series connection | Conductors connected |
|---|---|
| 1 | A1 and A4 |
| 2 | A2 and A5 |
| 3 | A3 and A6 |
| 4 | B1 and B4 |
| 5 | B2 and B5 |
| 6 | B3 and B6 |
| 7 | C1 and C4 |
| 8 | C2 and C5 |
| 9 | C3 and C6 |

Other approaches can be used.

Figure 3A:
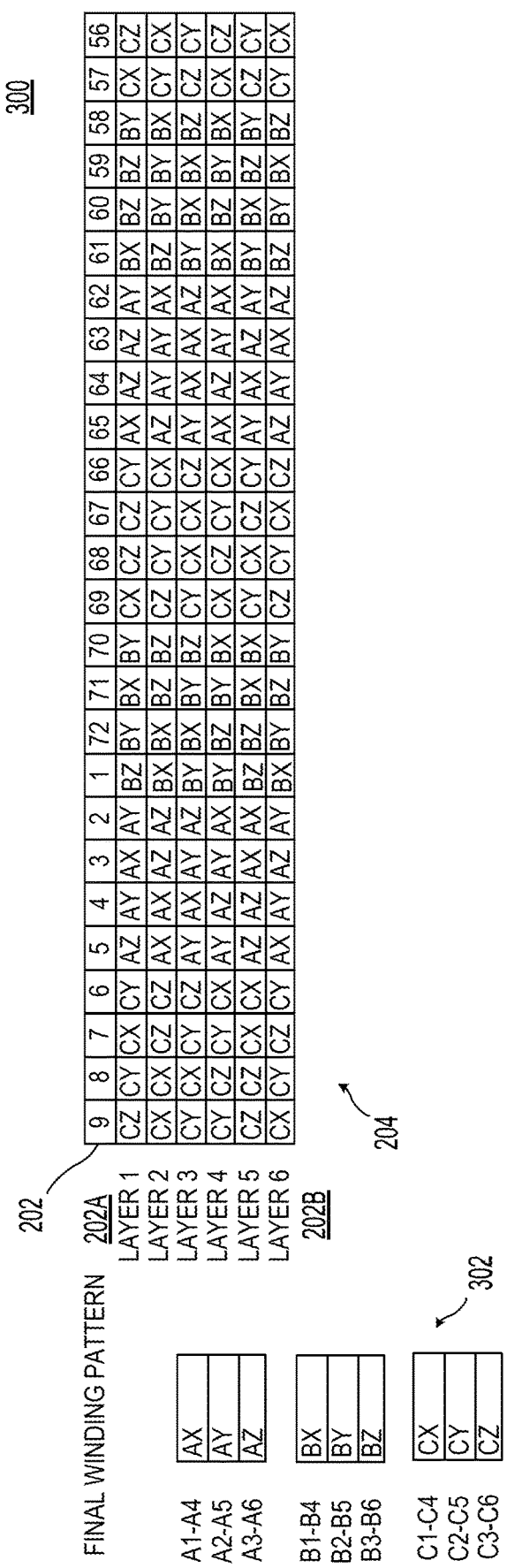
Figure 3B:
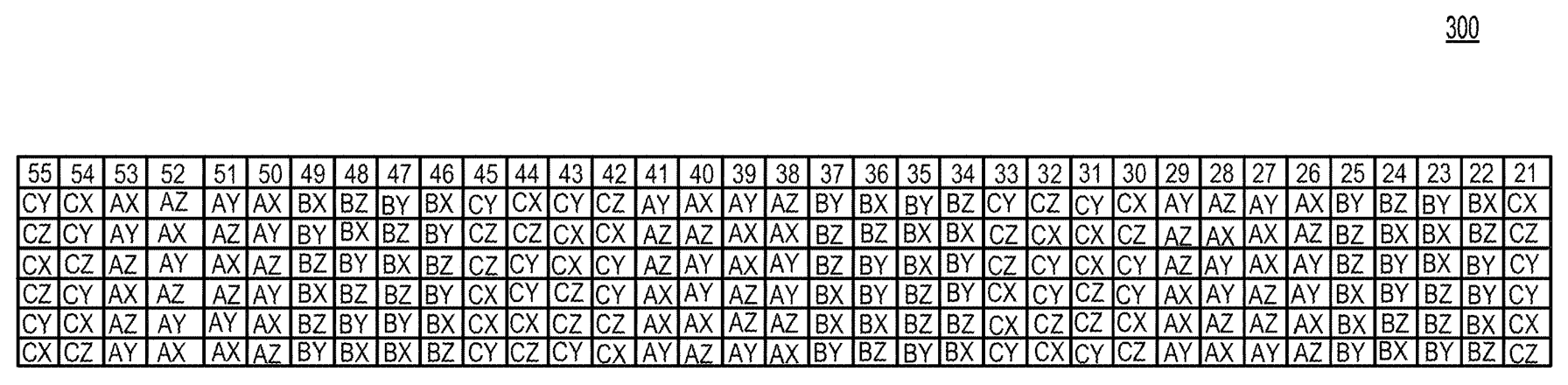
Figure 3C:
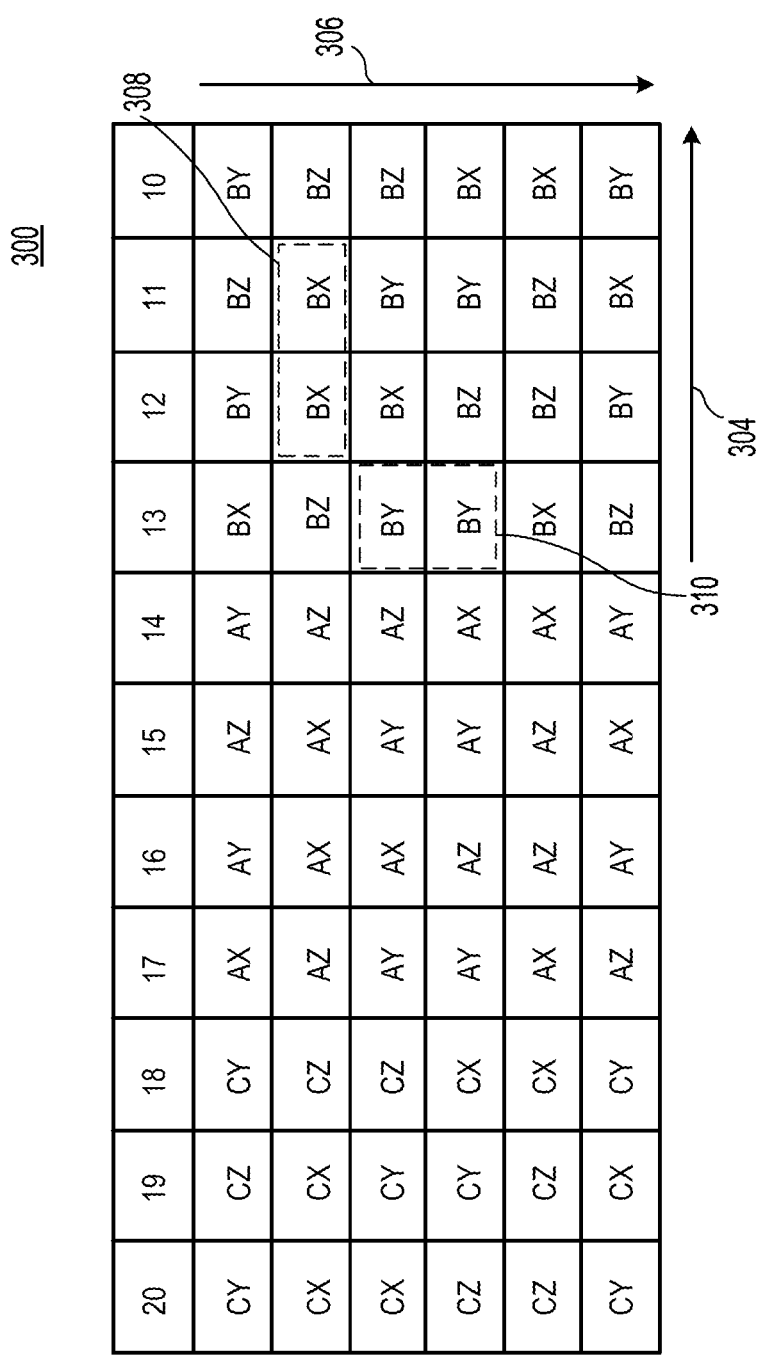

FIGS. 3A-3C show an example of a winding pattern 300 that can be obtained using the winding wraps of FIGS. 2A-2C. The winding pattern 300 can be used with one or more examples described elsewhere herein. The winding pattern 300 shows that the conductors are positioned within respective ones of the slots 202, and positioned in a linear arrangement between the back 202A and the front 202B of each of the slots 202.

A legend 302 indicates how labels used in the winding pattern 300 (i.e., AX, AY, and AZ; BX, BY, and BZ; and CX, CY, and CZ) correspond to the labels of the conductors in FIGS. 2A-2C (i.e., the labels A1 through A6, B1 through B6, and C1 through C6). In some implementations, the change of the labels indicates which of the conductors 204 are electrically connected. For example, the label change can be based on the formation of the series connections 214 (FIGS. 2A-2C). The labels used in the winding pattern 300 indicate how the conductors 204 are wound in a wave pattern around the stator, and in the course of such winding one or more types of pitch turns are made. For example, it can be seen that one or more of the conductors 204 makes a standard pitch turn or a nonstandard pitch turn (e.g., as exemplified below).

Each of the phases of the electric motor can be associated with a corresponding one of three phase belts formed by the conductors. The winding pattern 300 illustrates how the conductors 204 can be arranged within each phase belt and within each group of the slots 202 dedicated to that phase. In some implementations, each group of four among the slots 202 is associated with a respective phase, and each of the slots 202 contains six ones of the conductors 204. As such, the phase belt can be described as having a dimension 304 of a certain number of the slots 202 (e.g., four slots 202) and a dimension 306 of a certain number of the conductors 204 (e.g., six conductors 204).

The conductors 204 can be arranged among the slots 202 in one or more ways. In some implementations, each of the phase belts, in each slot 202 in the dimension 304, has equally many of the conductors 204 associated with respective ones of the three phases. For example, those of the slots 202 that have numbers 10-13 here contain eight of the conductors 204 that are labeled BX, eight of the conductors 204 that are labeled BY, and eight of the conductors 204 that are labeled BZ. For example, the one of the slots 202 that has number 10 has two of the conductors 204 that are labeled BX, two of the conductors 204 that are labeled BY, and two of the conductors 204 that are labeled BZ. The same is true for the respective ones of the slots 202 that have numbers 11, 12, and 13.

In some implementations, each of the phase belts can have at most two conductors associated with a respective one of the three phases positioned adjacent each other. Being positioned adjacent each other can correspond to being positioned along the dimension 304. For example, a dashed outline 308 here includes two of the conductors 204 that are labeled BX positioned adjacent each other along the dimension 304.

Being positioned adjacent each other can correspond to being positioned along the dimension 306. For example, a dashed outline 310 here includes two of the conductors 204 that are labeled BY positioned adjacent each other along the dimension 306.

FIGS. 4A-4B show an example of pitch turns 400 that can occur in the winding pattern of FIGS. 3A-3C. The pitch turns 400 can be used with one or more examples described elsewhere herein. The pitch turns 400 here present the structure of the stator winding by way of schematically showing the pitch turns 400 for three coils (here, "Coil 1," "Coil 2," and "Coil 3") that are being made with regard to respective poles 402 (here, "Pole1," "Pole2," "Pole3," "Pole4," "Pole5," and "Pole6") during one or more wraps (here, "Wrap1," "Wrap2," "Wrap3," and "Wrap4") of the stator.

In this example, FIG. 4A shows the initial part of the pitch turns 400 up until a particular pitch turn where a series connection 405 is indicated. For example, the series connection 405 can correspond to one or more of the series connections 214 (FIGS. 2A-2C). Accordingly, FIG. 4B shows the final part of the pitch turns 400 starting after the pitch turn of the series connection 405.

The pitch turns 400 can include a standard pitch turn 406. In some implementations, the standard pitch turn 406 involves wrapping around a number of slots equaling the total number of slots divided by the number of poles. For example, with 72 slots and 6 poles, the standard pitch turn 406 can involve wrapping the conductor of the corresponding coil around 12 slots.

The pitch turns 400 can include a nonstandard pitch turn 408. The nonstandard pitch turn 408 involves wrapping around a number of slots that is higher (i.e., that corresponds to more slots) than the standard pitch turn 406. In some implementations, the nonstandard pitch turn 408 can involve wrapping around 13, 14, or 15 slots. For example, the nonstandard pitch turn 408 here involves wrapping around 13 slots.

The pitch turns 400 can include a nonstandard pitch turn 410. The nonstandard pitch turn 410 involves wrapping around a number of slots that is lower (i.e., that corresponds to fewer slots) than the standard pitch turn 406. In some implementations, the nonstandard pitch turn 410 can involve wrapping around 9, 10, or 11 slots. For example, the nonstandard pitch turn 410 here involves wrapping around 9 slots.

The pitch turns 400 can include one or more patterns of the standard pitch turn 406, the nonstandard pitch turn 408, and/or the nonstandard pitch turn 410. In some implementations, the pitch turns 400 include the standard pitch turn 406 occurring generally except for the nonstandard pitch turn 408 and/or 410 occurring at every fourth one of the poles 402. For example, a repeating pattern in the pitch turns 400 can include a pattern 412 in which the standard pitch turn 406 occurs three times in a row, and thereafter the nonstandard pitch turn 408 occurs once. As another example, a repeating pattern in the pitch turns 400 can include a pattern 414 in which the standard pitch turn 406 occurs three times in a row, and thereafter the nonstandard pitch turn 410 occurs once. Here, a repeating pattern in the pitch turns 400 can include the pattern 412 occurring three times in a row followed by the pattern 414 occurring once.

The standard pitch turn 406, the nonstandard pitch turn 408, and/or the nonstandard pitch turn 410 can be identified also for the other coils in the pitch turns 400. Similarly, the patterns 412 and 414 can be identified also for the other coils in the pitch turns 400, albeit perhaps with regard to other ones of the poles 402 and/or the wraps 404 than the those for the coil discussed in the present example.

The above examples illustrate that an electric motor (e.g., the electric motor 100 in FIG. 1) can include a rotor (e.g., the rotor 102 in FIG. 1) having poles equaling a first number (e.g., six poles). The electric motor can include a stator (e.g., the stator 108 in FIG. 1) having slots (e.g., the slots 202) equaling a second number (e.g., 72 slots). The stator can have stator windings formed by conductors (e.g., the conductors 204) wound in a wave pattern around the stator (e.g., as shown in FIGS. 2A-2C). A third number of the conductors (e.g., six of the conductors 204) can be located in each of the slots, and the conductors can form three balanced parallel paths (e.g., originating at the leads 212 in FIGS. 2A-2C) through the slots. Each of the conductors in the three balanced parallel paths can undergo a same number of pitch turns, each of the pitch turns being either a standard pitch turn (e.g., the standard pitch turn 406) or a nonstandard pitch turn (e.g., the nonstandard pitch turn 408 and/or 410). The standard pitch turn can involve wrapping around slots equaling the second number divided by the first number (e.g., 12 slots). The nonstandard pitch turn can involve wrapping around more or fewer slots (e.g., 9, 10, 11, 13, 14, or 15 slots) than the standard pitch turn. Each of the three balanced parallel paths forms a repeating pattern throughout the slots (e.g., as shown by the pitch turns 400).

Figure 5A:
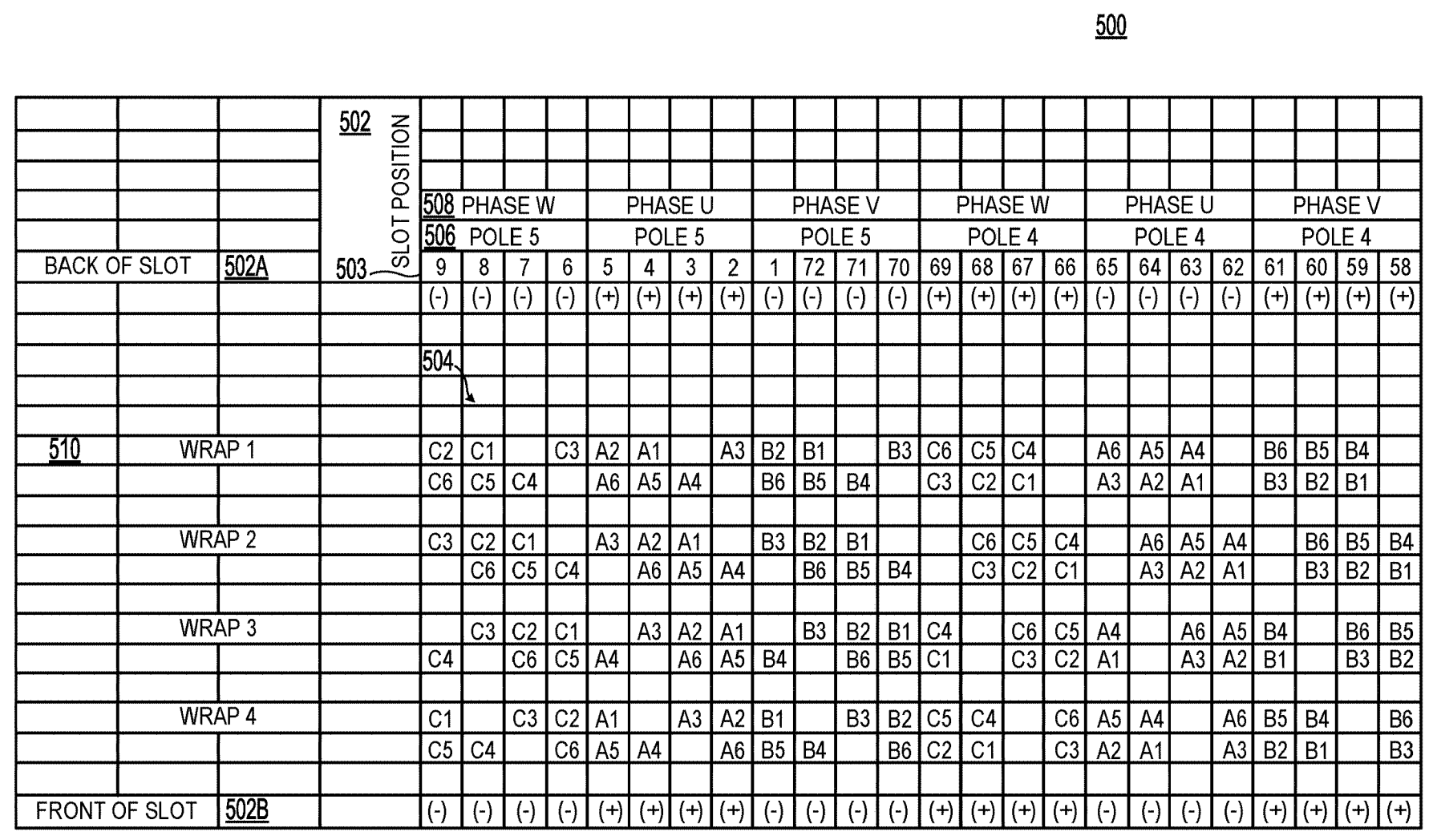
Figure 5B:
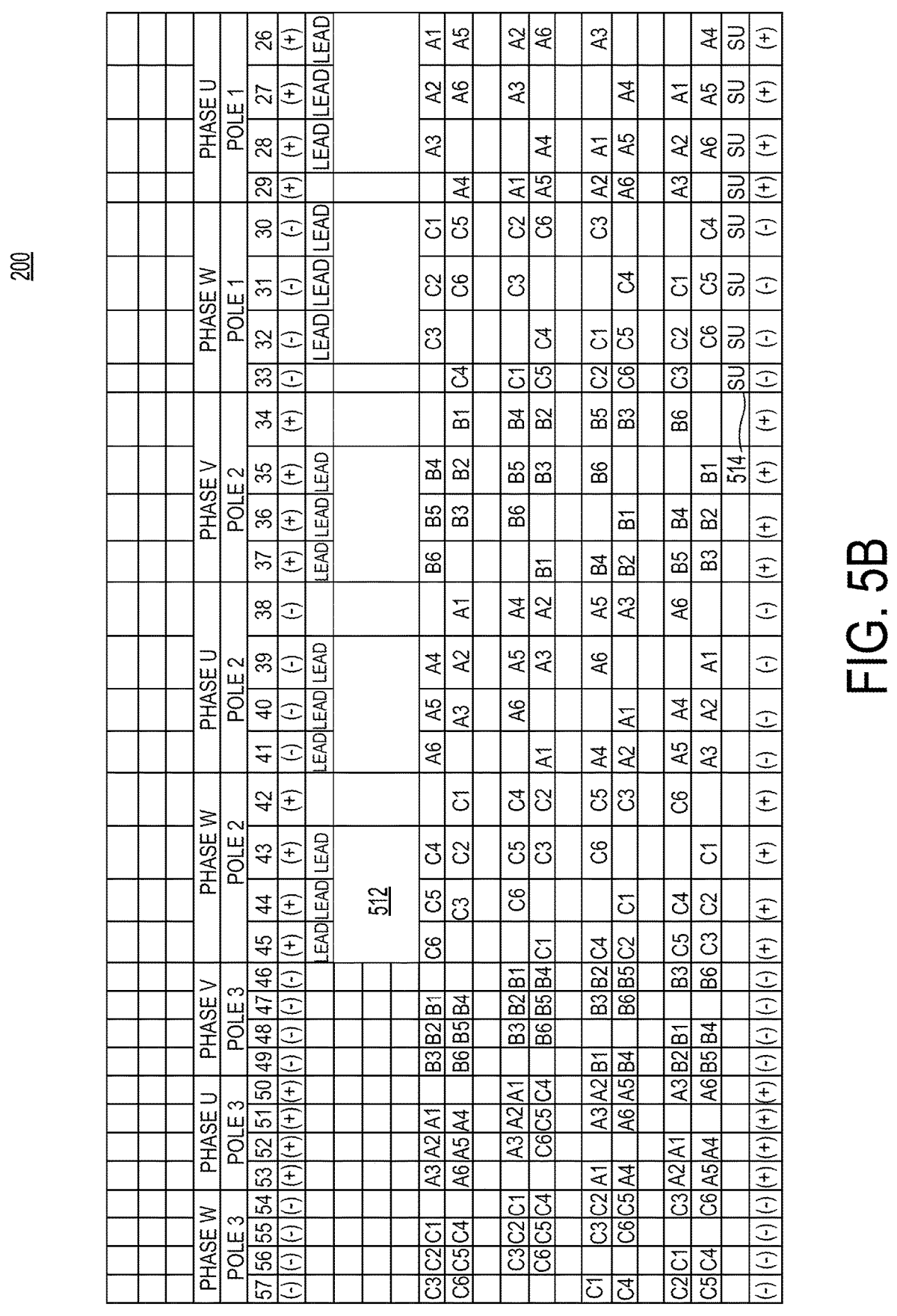
Figure 5C:
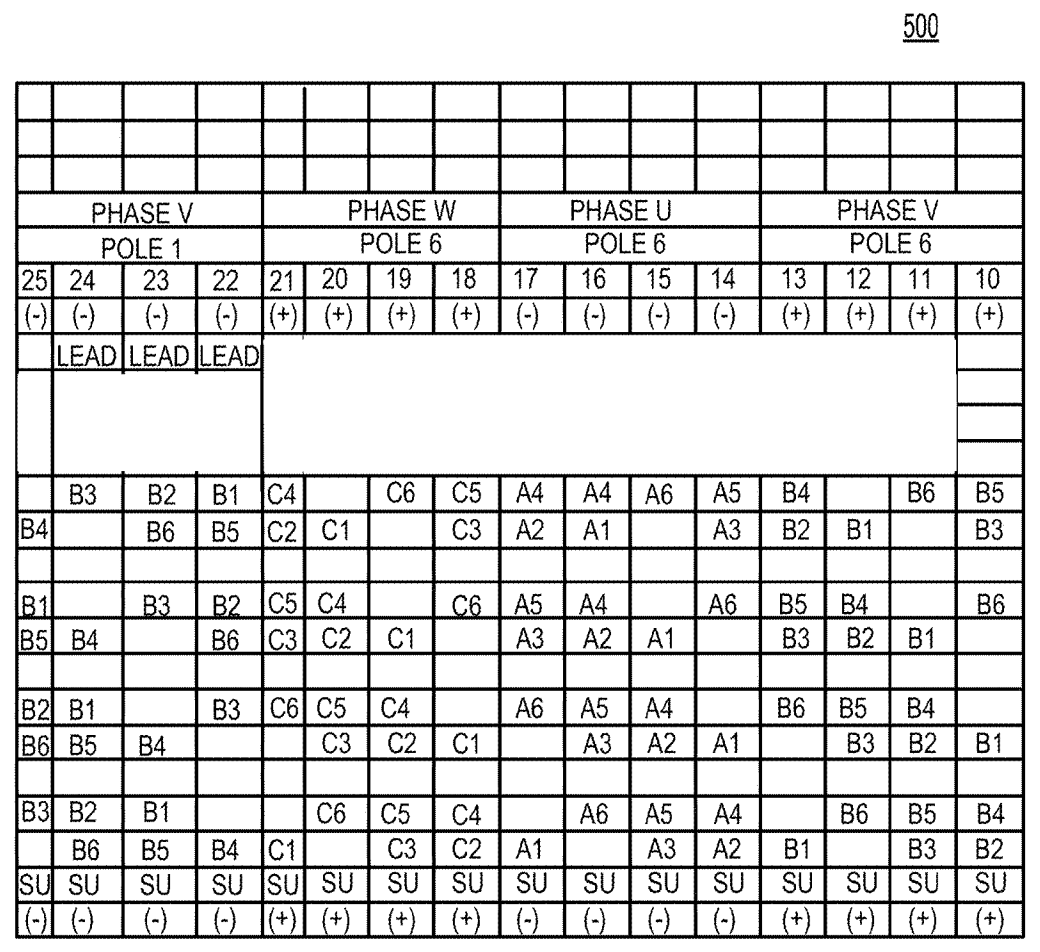

FIGS. 5A-5C show an example 500 of winding wraps for conductors of a stator. The example 500 can be used with one or more other examples described elsewhere herein. The example 500 here presents the structure of the stator winding by way of schematically showing slots 502 of the stator (here, "slot position") and for each of the slots 502 indicating conductors 504 that are being positioned within that slot 502. Here, the slots 502 are configured to hold respective ones of the conductors 504 in a linear arrangement between a back 502A of the slot 502 and a front 502B of the slot 110 (FIG. 1) (e.g., at an air gap or stator bore). A number of each slot is here indicated by a corresponding label 503 in the example 200.

Each of the conductors 504 is shown by way of a label (e.g., C2, B3, or A1) that is placed within a cell of the table shown in the example 500, the cell corresponding to a potential location for a conductor. The alphabetical character within each label of the conductors 504 (i.e., here A, B, or C) corresponds to an electrical phase with which that conductor 504 is associated. The number within each label of the conductors 504 (i.e., here 1, 2, 3, 4, 5, or 6) distinguishes the different conductors associated with the same phase from each other, and allows the reader to follow the path of any conductor 504 through the example 500. That is, a conductor 504 that is labeled B2 is an electric wire other than, say, the electric wire of a conductor 504 that is labeled B5. Nevertheless, these (and/or other) conductors may at some point be electrically connected to each other, for example as illustrated below.

The example 500 illustrates that the stator can have a number of poles 506. In some implementations, the stator exemplified by the example 500 has six poles 506. For example, each of the poles 506 can be associated with twelve of the slots 502.

The current of the stator in the example 500 can have multiple phases, and the example 500 here indicates a phase 508 for each of the slots 502. In some implementations, the stator can have three phases 508. For example, every group of four slots among the slots 502 can be associated with a respective one of the phases 508.

The stator winding in the example 500 can be formed by way of positioning the conductors 504 within respective ones of the slots 502 in an order corresponding to one or more wraps 510. The first one of the wraps 510 can involve placing some of the conductors 504 at or near the back 502A of the slots 502. Zero or more additional ones of the wraps 510 can subsequently be performed, as schematically illustrated. The last one of the wraps 510 can involve placing some of the conductors 504 at or near the front 502B of the slots 502. Here, the example 500 includes four ones of the wraps 510. In the winding process, the conductors 504 can first be wound linearly (e.g., on a flat surface), and thereafter coiled into respective ones of the slots 502. In so doing, those of the conductors 504 that are allocated to the same slot 502 can be placed nearer each other than what is schematically illustrated in the example 500. For example, all of the conductors 504 (e.g., six conductors) that are in the same one of the slots 502 can be placed adjacent (e.g., abutting) each other.

The conductors 504 can be wound in a wave pattern, (e.g., as indicated in the illustration) so as to form parallel paths through the slots 502. In some implementations, the parallel paths are balanced. For example, the conductors can form three balanced parallel paths. Each of the phases 508 can be associated with a corresponding one of multiple phase belts formed by the conductors 504. Here, leads 512 are formed at endpoints of some of the conductors 504. Each of the leads 512 is connected to some of the conductors 504. For example, one of the leads 512 associated with those of the slots 502 that have numbers 22-24 is here connected to those of the conductors 504 that have labels B1, B2, and B3. As another example, another one of the leads 512 associated with those of the slots 502 that have numbers 26-28 is here connected to those of the conductors 504 that have labels A1, A2, and A3. As another example, another one of the leads 512 associated with those of the slots 502 that have numbers 30-32 is here connected to those of the conductors 504 that have labels C1, C2, and C3. As another example, another one of the leads 512 associated with those of the slots 502 that have numbers 34-36 is here connected to those of the conductors 504 that have labels B4, B5, and B6. As another example, another one of the leads 512 associated with those of the slots 502 that have numbers 38-40 is here connected to those of the conductors 504 that have labels A4, A5, and A6. As another example, another one of the leads 512 associated with those of the slots 502 that have numbers 42-44 is here connected to those of the conductors 504 that have labels C4, C5, and C6. Other approaches can be used.

Two or more of the conductors 504 can be joined or otherwise be part of a common coil. In some implementations, one or more series connections 514 can be made at the front 502B of the slots 502. For example, respective ones of the series connection 514 can be provided between pairs of the conductors 504 as shown in the following table:

| Series connection | Conductors connected |
|---|---|
| 1 | A1 and A4 |
| 2 | A2 and A5 |
| 3 | A3 and A6 |
| 4 | B1 and B4 |
| 5 | B2 and B5 |
| 6 | B3 and B6 |
| 7 | C1 and C4 |
| 8 | C2 and C5 |
| 9 | C3 and C6 |

Other approaches can be used.

Figure 6A:
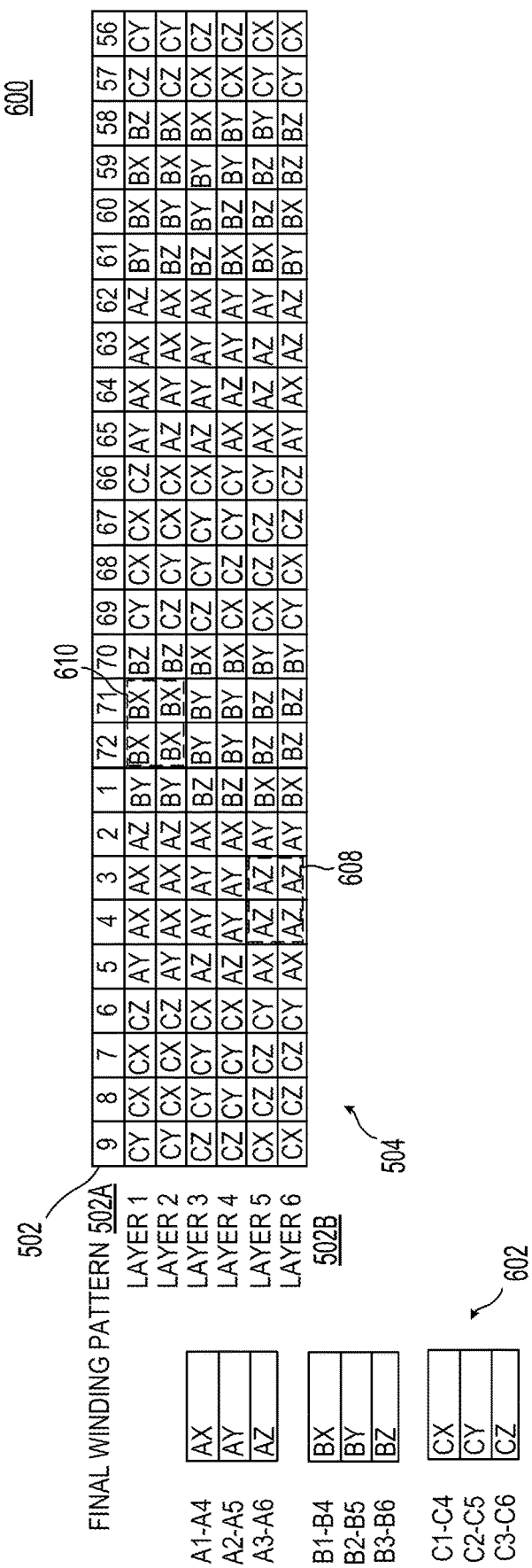
Figure 6C:
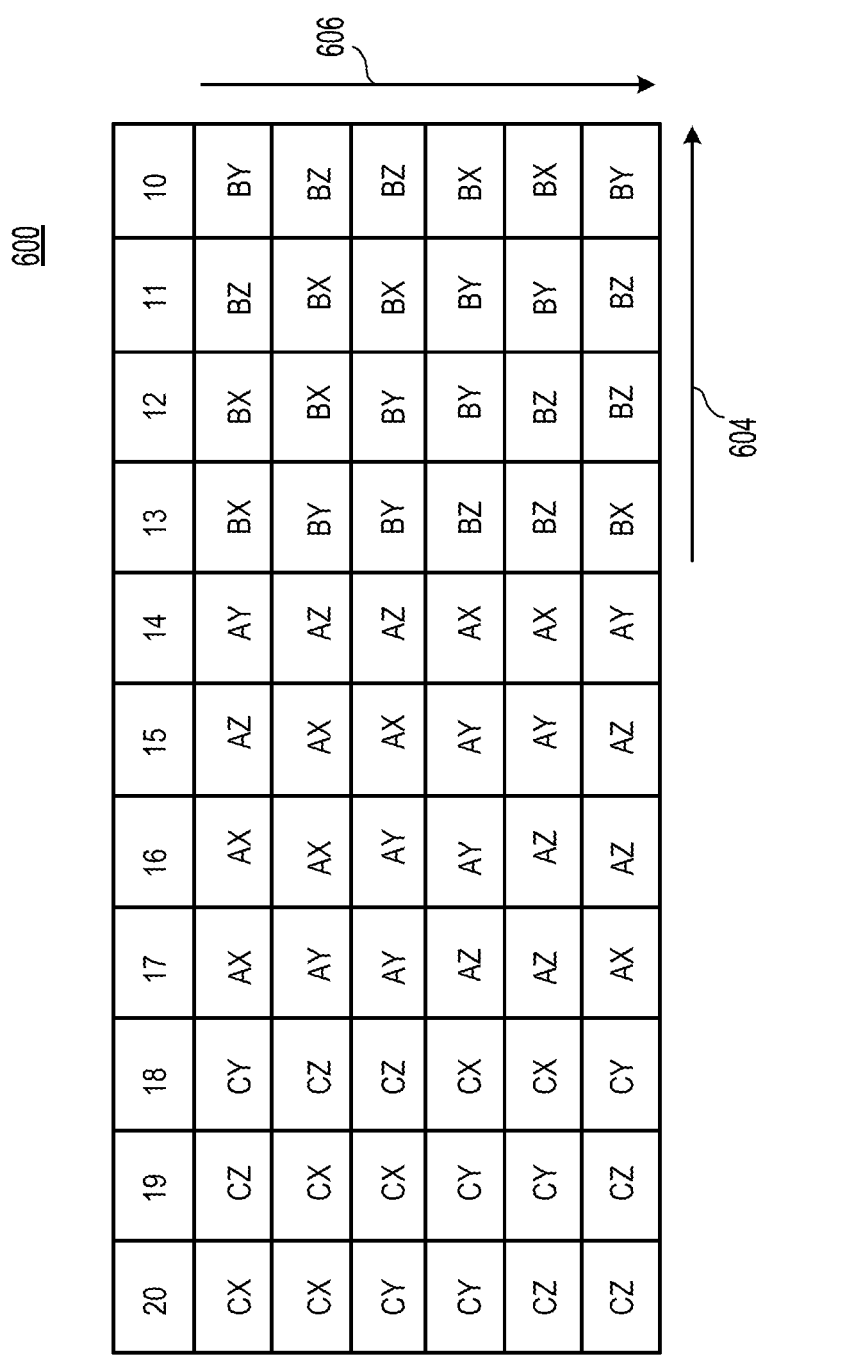

FIGS. 6A-6C show an example of a winding pattern 600 that can be obtained using the winding wraps of FIGS. 5A-5C. The winding pattern 600 can be used with one or more examples described elsewhere herein. The winding pattern 600 shows that the conductors are positioned within respective ones of the slots 502, and positioned in a linear arrangement between the back 502A and the front 502B of each of the slots 502.

A legend 602 indicates how labels used in the winding pattern 600 (i.e., AX, AY, and AZ; BX, BY, and BZ; and CX, CY, and CZ) correspond to the labels of the conductors in FIGS. 5A-5C (i.e., the labels A1 through A6, B1 through B6, and C1 through C6). In some implementations, the change of the labels indicates which of the conductors 504 are electrically connected. For example, the label change can be based on the formation of the series connections 514 (FIGS. 5A-5C). The labels used in the winding pattern 600 indicate how the conductors 504 are wound in a wave pattern around the stator, and in the course of such winding one or more types of pitch turns are made. For example, it can be seen that one or more of the conductors 504 makes a standard pitch turn or a nonstandard pitch turn (e.g., as exemplified below).

Each of the phases of the electric motor can be associated with a corresponding one of three phase belts formed by the conductors. The winding pattern 600 illustrates how the conductors 504 can be arranged within each phase belt and within each group of the slots 502 dedicated to that phase. In some implementations, each group of four among the slots 502 is associated with a respective phase, and each of the slots 502 contains six ones of the conductors 504. As such, the phase belt can be described as having a dimension 604 of a certain number of the slots 502 (e.g., four slots 502) and a dimension 606 of a certain number of the conductors 504 (e.g., six conductors 504).

The conductors 504 can be arranged among the slots 502 in one or more ways. In some implementations, each of the phase belts, in each slot 502 in the dimension 604, has equally many of the conductors 504 associated with respective ones of the three phases. For example, those of the slots 502 that have numbers 10-13 here contain eight of the conductors 504 that are labeled BX, eight of the conductors 504 that are labeled BY, and eight of the conductors 504 that are labeled BZ. For example, the one of the slots 502 that has number 10 has two of the conductors 504 that are labeled BX, two of the conductors 504 that are labeled BY, and two of the conductors 504 that are labeled BZ. The same is true for the respective ones of the slots 502 that have numbers 11, 12, and 13.

The conductors 504 can be grouped among the slots 502 of a phase belt in one or more ways. In some implementations, the phase belt has at most four conductors associated with a respective one of the three phases positioned as a contiguous group in the dimensions 604 and 606. For example, a dashed outline 608 here includes four of the conductors 504 that are labeled AZ. As another example, a dashed outline 610 here includes four of the conductors 504 that are labeled BX.

In some implementations, each of the phase belts can have at most two conductors associated with a respective one of the three phases positioned adjacent each other. Being positioned adjacent each other can correspond to being positioned along the dimension 604. For example, the dashed outline 608 here includes two of the conductors 504 that are labeled AZ positioned adjacent each other along the dimension 604. As another example, the dashed outline 610 here includes two of the conductors 504 that are labeled BX positioned adjacent each other along the dimension 304.

Being positioned adjacent each other can correspond to being positioned along the dimension 606. For example, the dashed outline 608 here includes two of the conductors 504 that are labeled AZ positioned adjacent each other along the dimension 606. As another example, the dashed outline 610 here includes two of the conductors 504 that are labeled BX positioned adjacent each other along the dimension 606.

FIGS. 7A-7B show an example of pitch turns 700 that can occur in the winding pattern of FIGS. 6A-6C. The pitch turns 700 can be used with one or more examples described elsewhere herein. The pitch turns 700 here presents the structure of the stator winding by way of schematically showing the pitch turns 700 for three coils (here, "Coil 1," "Coil 2," and "Coil 3") that are being made with regard to respective poles 702 (here, "Pole1," "Pole2," "Pole3," "Pole4," "Pole5," and "Pole6") during one or more wraps (here, "Wrap1," "Wrap2," "Wrap3," and "Wrap4") of the stator.

In this example, FIG. 7A shows the initial part of the pitch turns 700 up until a particular pitch turn where a series connection 705 is indicated. For example, the series connection 705 can correspond to one or more of the series connections 514 (FIGS. 5A-5C). Accordingly, FIG. 7B shows the final part of the pitch turns 700 starting after the pitch turn of the series connection 705.

The pitch turns 700 can include a standard pitch turn 706. In some implementations, the standard pitch turn 706 involves wrapping around a number of slots equaling the total number of slots divided by the number of poles. For example, with 72 slots and 6 poles, the standard pitch turn 706 can involve wrapping the conductor of the corresponding coil around 12 slots.

The pitch turns 700 can include a nonstandard pitch turn 708. The nonstandard pitch turn 708 involves wrapping around a number of slots that is higher (i.e., that corresponds to more slots) than the standard pitch turn 706. In some implementations, the nonstandard pitch turn 708 can involve wrapping around 13, 14, or 15 slots. For example, the nonstandard pitch turn 708 here involves wrapping around 13 slots.

The pitch turns 700 can include a nonstandard pitch turn 710. The nonstandard pitch turn 710 involves wrapping around a number of slots that is lower (i.e., that corresponds to fewer slots) than the standard pitch turn 706. In some implementations, the nonstandard pitch turn 710 can involve wrapping around 9, 10, or 11 slots. For example, the nonstandard pitch turn 710 here involves wrapping around 9 slots.

The pitch turns 700 can include one or more patterns of the standard pitch turn 706, the nonstandard pitch turn 708, and/or the nonstandard pitch turn 710. In some implementations, the pitch turns 700 include the standard pitch turn 706 occurring generally except for the nonstandard pitch turn 708 and/or 710 occurring at every other of the poles 702. For example, a repeating pattern in the pitch turns 700 can include a pattern 712 in which the standard pitch turn 706 occurs once, and thereafter the nonstandard pitch turn 708 occurs once. As another example, a repeating pattern in the pitch turns 700 can include a pattern 714 in which the standard pitch turn 706 occurs once, and thereafter the nonstandard pitch turn 710 occurs once. Here, a repeating pattern in the pitch turns 700 can include the pattern 712 occurring three times in a row followed by the pattern 714 occurring once.

The standard pitch turn 706, the nonstandard pitch turn 708, and/or the nonstandard pitch turn 710 can be identified also for the other coils in the pitch turns 700. Similarly, the patterns 712 and 714 can be identified also for the other coils in the pitch turns 700, albeit perhaps with regard to other ones of the poles 702 and/or the wraps 704 than the those for the coil discussed in the present example.

The above examples illustrate that an electric motor (e.g., the electric motor 100 in FIG. 1) can include a rotor (e.g., the rotor 102 in FIG. 1) having poles equaling a first number (e.g., six poles). The electric motor can include a stator (e.g., the stator 108 in FIG. 1) having slots (e.g., the slots 502) equaling a second number (e.g., 72 slots). The stator can have stator windings formed by conductors (e.g., the conductors 504) wound in a wave pattern around the stator (e.g., as shown in FIGS. 5A-5C). A third number of the conductors (e.g., six of the conductors 504) can be located in each of the slots, and the conductors can form three balanced parallel paths (e.g., originating at the leads 512 in FIGS. 5A-5C) through the slots. Each of the conductors in the three balanced parallel paths can undergo a same number of pitch turns, each of the pitch turns being either a standard pitch turn (e.g., the standard pitch turn 706) or a nonstandard pitch turn (e.g., the nonstandard pitch turn 708 and/or 710). The standard pitch turn can involve wrapping around slots equaling the second number divided by the first number (e.g., 12 slots). The nonstandard pitch turn can involve wrapping around more or fewer slots (e.g., 9, 10, 11, 13, 14, or 15 slots) than the standard pitch turn. Each of the three balanced parallel paths forms a repeating pattern throughout the slots (e.g., as shown by the pitch turns 700).

The terms "substantially" and "about" used throughout this specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An electric motor comprising:
a rotor having poles equaling a first number; and
a stator having slots equaling a second number, the stator having stator windings formed by conductors wound in a wave pattern around the stator, wherein a third number of the conductors are located in each of the slots, wherein the conductors form three balanced parallel paths through the slots, each of the conductors in the three balanced parallel paths undergoing a same number of pitch turns, each of the pitch turns being either a standard pitch turn or a nonstandard pitch turn, the standard pitch turn involving wrapping around slots equaling the second number divided by the first number, the nonstandard pitch turn involving wrapping around more or fewer slots than the standard pitch turn, wherein each of the three balanced parallel paths forms a repeating pattern throughout the slots;
wherein the repeating pattern comprises the nonstandard pitch turn occurring at every fourth pole, wherein the repeating pattern includes a first pattern in which the standard pitch turn involves wrapping around 12 slots and in which the nonstandard pitch turn involves wrapping around 13 slots, and wherein the repeating pattern further includes a second pattern in which the standard pitch turn involves wrapping around 12 slots and in which the nonstandard pitch turn involves wrapping around 9 slots.

2. The electric motor of claim 1, wherein the first number is 6.

3. The electric motor of claim 1, wherein the second number is 72.

4. The electric motor of claim 1, wherein the third number is 6.

5. The electric motor of claim 1, wherein each of the conductors has a rectangular cross section, and wherein each of the slots is configured to hold the third number of the conductors in a linear arrangement.

6. The electric motor of claim 1, wherein the repeating pattern includes the first pattern occurring three times in a row followed by the second pattern occurring once.

7. The electric motor of claim 1, wherein the electric motor has three phases.

8. The electric motor of claim 7, wherein each of the phases is associated with a corresponding one of three phase belts formed by the conductors, each phase belt having a first dimension of four slots and a second dimension of six conductors.

9. The electric motor of claim 8, wherein each of the phase belts, in each slot in the first dimension, has equally many of the conductors associated with respective ones of the three phases.

10. The electric motor of claim 8, wherein each of the phase belts has at most four conductors associated with a respective one of the three phases positioned as a contiguous group in the first and second dimensions.

11. The electric motor of claim 8, wherein each of the phase belts has at most two conductors associated with a respective one of the three phases positioned adjacent each other.

12. The electric motor of claim 11, wherein adjacent each other corresponds to being positioned along the first dimension.

13. The electric motor of claim 11, wherein adjacent each other corresponds to being positioned along the second dimension.

14. An electric motor comprising:
a rotor having poles equaling a first number; and
a stator having slots equaling a second number, the stator having stator windings formed by conductors wound in a wave pattern around the stator, wherein a third number of the conductors are located in each of the slots, wherein the conductors form three balanced parallel paths through the slots, each of the conductors in the three balanced parallel paths undergoing a same number of pitch turns, each of the pitch turns being either a standard pitch turn or a nonstandard pitch turn, the standard pitch turn involving wrapping around slots equaling the second number divided by the first number, the nonstandard pitch turn involving wrapping around more or fewer slots than the standard pitch turn, wherein each of the three balanced parallel paths forms a repeating pattern throughout the slots;
wherein the repeating pattern comprises the nonstandard pitch turn occurring at every other pole, wherein the repeating pattern includes a first pattern in which the standard pitch turn involves wrapping around 12 slots and in which the nonstandard pitch turn involves wrapping around 13 slots, and wherein the repeating pattern further includes a second pattern in which the standard pitch turn involves wrapping around 12 slots and in which the nonstandard pitch turn involves wrapping around 9 slots.

15. The electric motor of claim 14, wherein the repeating pattern includes the first pattern occurring three times in a row followed by the second pattern occurring once.

16. An electric motor comprising:
a rotor having poles equaling a first number; and
a stator having slots equaling a second number, the stator having stator windings formed by conductors wound in a wave pattern around the stator, wherein a third number of the conductors are located in each of the slots, wherein the conductors form three balanced parallel paths through the slots, each of the conductors in the three balanced parallel paths undergoing a same number of pitch turns, each of the pitch turns being either a standard pitch turn or a nonstandard pitch turn, the standard pitch turn involving wrapping around slots equaling the second number divided by the first number, the nonstandard pitch turn involving wrapping around more or fewer slots than the standard pitch turn, wherein each of the three balanced parallel paths forms a repeating pattern throughout the slots, wherein the repeating pattern includes a first pattern of multiple pitch turns occurring three times in a row immediately followed by a second pattern of multiple pitch turns occurring once, the second pattern different from the first pattern.

* * * * *